United States Patent Office 2,697,732
Patented Dec. 21, 1954

2,697,732

O-DEALKYLATION PROCESS

Julian M. Mavity, Hinsdale, Ill., assignor to Universal Oil Products Company, Chicago, Ill., a corporation of Delaware No Drawing. Application February 28, 1952, Serial No. 274,078

11 Claims. (Cl. 260—613)

This invention relates to an O-dealkylation process and more particularly to a novel method of converting an ether into the corresponding hydroxy compound. The term "O-dealkylation" is used to designate the splitting of an ether, illustrated as R—O—R', between the oxygen and either the R or R'. The invention is particularly applicable to the O-dealkylation of aromatic ethers as, for example, the O-dealkylation of an aromatic ether to the corresponding aromatic hydroxy compound. Illustrative examples include the conversion of methoxybenzene to phenol, dimethoxybenzene to methoxyphenol, ethoxynaphthol to dihydroxynaphthalene, etc.

While, as hereinbefore set forth, the present invention is applicable to the conversion of an ether to the corresponding hydroxy compound, it may be particularly useful in processes where it is desired to form a monoalkyl-ether of an aromatic hydroxy compound as, for example, p-methoxyphenol, in which process the dialkoxy compound (p-dimethoxybenzene) is unavoidably formed and the latter compound is only of limited or of no practical utility and represents a loss in the desired yields of the monoalkoxy compound. In accordance with the present invention, the dialkoxy compound may be converted to the desired monoalkoxy compound. Thus, for example, p-dimethoxybenzene may be converted to p-methoxyphenol.

In one embodiment the present invention relates to an O-dealkylation process which comprises reacting an ether with an organic acid.

In another embodiment the present invention relates to an O-dealkylation process which comprises reacting an aromatic ether with an organic acid in the presence of an O-dealkylation catalyst.

In a specific embodiment the present invention relates to an O-dealkylation process which comprises reacting p-dimethoxybenzene with acetic acid at an elevated temperature in the presence of a metal oxide O-dealkylation catalyst.

As hereinbefore set forth, the present invention comprises a novel process for converting an ether into the corresponding hydroxy compound. In a preferred embodiment the present invention relates to the conversion of an aromatic ether to the corresponding aromatic hydroxy compound. Any suitable aromatic ether may be treated in accordance with the present invention including methoxybenzene, ethoxybenzene, propoxybenzene, butoxybenzene, pentoxybenzene, hexoxybenzene, heptoxybenzene, etc., and similar aromatic ethers containing one or more substituent groups attached to the ring, which substituent groups may comprise hydrocarbon groups, including alkyl, alkaryl, aryl, aralkyl, cycloalkyl groups, etc., or groups containing oxygen, nitrogen and/or sulfur attached either to the ring or to the hydrocarbon substituents. As hereinbefore set forth, the benzene ring may contain two or more oxygen-containing substituent groups as, for example, in a preferred embodiment of the invention, p-dimethoxybenzene is converted to p-methoxyphenol. Other polyalkoxy compounds which may be treated in accordance with the present invention include o-dimethoxybenzene, m-dimethoxybenzene, diethoxybenzenes, dipropoxybenzenes, dibutoxybenzenes, dipentoxybenzenes, dihexoxybenzenes, diheptoxybenzenes, etc., trimethoxybenzenes, triethoxybenzenes, tripropoxybenzenes, etc., in which the alkoxy groups are in a position ortho, meta or para to each other and in which the benzene nucleus may contain substituents in a manner as hereinbefore set forth. It is further understood that the novel process of the present invention may be applied to polycyclic aromatic compounds including substituted naphthalenes, anthracenes, etc. containing at least one alkoxy group and which may contain other substituents in a manner similar to those specifically set forth in connection with the benzene compound.

The reaction of the present invention, as applied to the O-dealkylation of p-dimethoxybenzene, may be illustrated by the following equation:

MeO.C₆H₄.O Me+RCOOH→MeO.C₆H₄.OH+RCOOMe

From the above equation it will be noted that one of the methyl groups from the p-dimethoxybenzene is replaced by the hydrogen of the acid to form p-methoxyphenol and the methyl ester of the acid.

The R of the acid represented by the above equation may be either an aliphatic or an aromatic hydrocarbon radical and may be substituted by one or more groups containing oxygen, nitrogen and/or sulfur. A preferred acid comprises acetic acid. Other satisfactory but not necessarily equivalent acids include formic acid, propionic acid, butyric acid, valeric acid, caproic acid, caprylic acid, pelargic acid, capric acid, myristic acid, palmitic acid, stearic acid, etc., chloro-organic acids, including chloroacetic acid, dichloro-acetic acid, trichloro-acetic acid, benzoic acid, cumic acid, phenylacetic acid, cinnamic acid, anthranilic acid, phthalic acid, salicyclic acid, anisic acid, etc.

The O-dealkylation may be effected in the presence of any suitable catalyst. Preferred catalysts are of the metal oxide type and include such catalysts as silica-alumina, silica-zirconia, silica-alumina-zirconia, silica-magnesia, silica-alumina-magnesia, silica-titania, silica-alumina-titania, silica-thoria, silica-alumina-thoria, silica-vanadia, silica-alumina-vanadia, alumina-boria, magnesia-boria, zirconia-boria, etc. or mixtures of these oxides. These catalysts may be synthetically prepared or naturally occurring. Other catalysts comprise acids including sulfuric acid, phosphoric acid, both H₃PO₄ and H₄P₂O₇, hydrochloric acid, hydrofluoric acid, toluene sulfonic acid, etc. The acid catalysts may be used in a liquid state or composited with a suitable adsorbent material such as silica, alumina, magnesia, etc. A particularly satisfactory catalyst of this class comprises supported phosphoric acid, which is in association of phosphoric acid and a diatomaceous earth, the catalyst being commonly referred to in the art as solid phosphoric acid.

The O-dealkylation process may be effected at any suitable temperature. The temperature to be utilized will depend upon the particular catalyst employed. With the metal oxide catalysts hereinbefore set forth, the temperature generally will be within the range of from about 300° to about 700° F., although lower or higher temperatures may be utilized in some cases. When using the acid catalysts, lower temperatures generally will be employed depending upon the particular acid catalyst being used. In most cases the temperature will range from about atmospheric and will not exceed about 300° F., although lower or higher temperatures may be employed in some cases. The pressure to be employed may range from atmospheric to 1000 pounds or more.

The reaction may be effected in any suitable manner and will depend upon the particular catalyst employed. When a solid catalyst is utilized, it preferably is employed as a fixed bed in a reaction zone, and the reactants are passed either in downward or upward flow therethrough for a continuous type operation. Other continuous types of operation include those in which the reactants and catalysts pass concurrently through the reaction zone or those in which the catalyst moves countercurrently to the reactants. When employing a liquid catalyst a suitable method comprises intimately contacting the reactants and catalysts in a reaction zone equipped with suitable stirring or circulating means. When desired, the reaction may be effected in the batch type operation, in which the reactants and catalysts are disposed in a reaction zone maintained at the desired temperature for the desired time, generally with some means for effecting intimate contact between reactants and catalyst. It is understood that any suitable method for effecting the reaction may be employed in accordance with the present invention. After the reaction has been completed, the products are separated to recover the desired product, and the unconverted ether and organic acid may be recycled, all or in part, to the process for further conversion therein. Similarly, in other than the fixed bed type of process, the catalyst may be recycled, all or in part, for further use in the process. The alkyl ester of the organic acid, formed in the process, may be withdrawn for any desired use or may be converted to the acid in any suitable manner and reused in the process.

The following examples are introduced to illustrate further the novelty and utility of the present invention but not with the intention of unduly limiting the same.

Example I

This example illustrates the O-dealkylation of p-dimethoxybenzene. 68.89 grams of p-dimethoxybenzene, 30.96 grams of glacial acetic acid and 20 grams of a commercially available silica-alumina catalyst were heated in a glass lined rotating bomb under a pressure of approximately 225 pounds of nitrogen for 3 hours at an average temperature of about 400° F. After cooling, the products were removed from the bomb and separated by means of distillation and extraction with ether. From this operation there were produced 23 mol per cent of p-methoxyphenol, based on the mol per cent of p-dimethoxybenzene charged, 38 mol per cent of methyl acetate, as well as 53 mol per cent of unreacted p-dimethoxybenzene, and 3 mol per cent of hydroquinone. The unreacted p-dimethoxybenzene may be recycled to the process in order to further increase the yields of the desired p-methoxyphenol.

It will be noted that, under the particular conditions of this run, the reaction was selective to produce mono-O-dealkylation, and that only 3 mol per cent of di-O-dealkylation product (hydroquinone) was produced. In the event that hydroquinone is the desired end product, di-O-dealkylation may be obtained by effecting reaction at a higher temperature.

Example II p-Ethoxyphenol may be reacted with glacial acetic acid in the presence of hydrogen fluoride at room temperature in a reaction zone equipped with stirring means to effect intimate contact between the reactants and catalyst. Hydroquinone will be formed in this reaction, as well as the ethyl ester of acetic acid.

Example III

Propoxybenzene may be converted to phenol by reacting with propionic acid in the presence of a composite of phosphoric acid and diatomaceous earth, which composite is commonly referred to as solid phosphoric acid, at a temperature of 450° F. The solid phosphoric acid may be employed as a fixed bed in a reaction zone, and the reactants at the desired temperature may be passed therethrough in downward flow.

I claim as my invention:

1. An O-dealkylation process which comprises reacting an aromatic ether with an organic acid in the presence of an O-dealkylation catalyst selected from the group consisting of metal oxides and acids at a temperature of from about atmospheric to about 300° F. when the catalyst comprises an acid and at a temperature of from about 300° to about 700° F. when the catalyst comprises a metal oxide.

2. An O-dealkylation process which comprises reacting an aromatic ether with an organic acid at a temperature of from about 300° to about 700° F. in the presence of a metal oxide O-dealkylation catalyst.

3. An O-dealkylation process which comprises reacting an aromatic ether with an organic acid at a temperature of from about atmospheric to about 300° F. in the presence of a mineral acid O-dealkylation catalyst.

4. A process for converting p-dimethoxybenzene to p-methoxyphenol which comprises subjecting said p-dimethoxybenzene to reaction with an organic acid in the presence of a metal oxide O-dealkylation catalyst at a temperature of from about 300° to 700° F.

5. A process for converting p-dimethoxybenzene to p-methoxyphenol which comprises subjecting said p-dimethoxybenzene to reaction with an organic acid at a temperature of from about 300° to about 700° F. in the presence of a silica-metal oxide O-dealkylation catalyst.

6. A process for converting p-dimethoxybenzene to p-methoxyphenol which comprises subjecting said p-dimethoxybenzene to reaction with acetic acid at a temperature of from about 300° to about 700° F. in the presence of a silica-alumina catalyst.

7. A process for converting p-dimethoxybenzene to p-methoxyphenol which comprises subjecting said p-dimethoxybenzene to reaction with acetic acid at a temperature of from about 300° to about 700° F. in the presence of a silica-magnesia catalyst.

8. A process for converting p-dimethoxybenzene to p-methoxyphenol which comprises subjecting said p-dimethoxybenzene to reaction with acetic acid at a temperature of from about 300° to about 700° F. in the presence of a silica-zirconia catalyst.

9. A process for converting p-dimethoxybenzene to p-methoxyphenol which comprises subjecting said p-dimethoxybenzene to reaction with an organic acid in the presence of an acid catalyst at a temperature of from about atmospheric to about 300° F.

10. A process for converting p-dimethoxybenzene to p-methoxyphenol which comprises subjecting said p-dimethoxybenzene to reaction with an organic acid in the presence of sulfuric acid at a temperature of from about atmospheric to about 300° F.

11. A process for converting p-dimethoxybenzene to p-methoxyphenol which comprises subjecting said p-dimethoxyzenzene to reaction with an organic acid in the presence of hydrofluoric acid at a temperature of from about atmospheric to about 300° F.

References Cited in the file of this patent

UNITED STATES PATENTS

| Number | Name | Date |
|---|---|---|
| 2,100,228 | Tinker et al. | Nov. 23, 1937 |
| 2,551,737 | Haensel | May 8, 1951 |